(12) United States Patent
Loh et al.

(10) Patent No.: US 10,919,725 B2
(45) Date of Patent: Feb. 16, 2021

(54) METHOD AND APPARATUS FOR DEPLOYMENT OF A DEVICE SYSTEM

(71) Applicants: Yuh Loh, Cypress, TX (US); Thomas McClain Scott, Cypress, TX (US); Lorn Rendall, Houston, TX (US)

(72) Inventors: Yuh Loh, Cypress, TX (US); Thomas McClain Scott, Cypress, TX (US); Lorn Rendall, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 287 days.

(21) Appl. No.: 15/937,557

(22) Filed: Mar. 27, 2018

(65) Prior Publication Data

US 2019/0300322 A1 Oct. 3, 2019

(51) Int. Cl.
H01R 43/00 (2006.01)
H05K 13/00 (2006.01)
B65H 49/36 (2006.01)
B65H 49/20 (2006.01)

(52) U.S. Cl.
CPC ............. *B65H 49/36* (2013.01); *B65H 49/20* (2013.01); *B65H 2701/341* (2013.01)

(58) Field of Classification Search
CPC .... B65H 75/38; B65H 75/4402; B65H 49/20; B65H 49/36; B65H 2701/341; B65H 2701/39; H02G 11/02
See application file for complete search history.

(56) References Cited

U.S. PATENT DOCUMENTS

| 4,147,384 | A | * | 4/1979 | Heckethorn | F16L 25/04 |
| | | | | | 24/277 |
| 4,426,761 | A | * | 1/1984 | Sassak | B21D 39/04 |
| | | | | | 285/381.1 |
| 4,917,625 | A | * | 4/1990 | Haile | H01R 13/639 |
| | | | | | 439/358 |
| 4,941,690 | A | * | 7/1990 | Bodine, Sr. | F16L 13/16 |
| | | | | | 285/38 |
| 5,762,515 | A | * | 6/1998 | Mele | H01R 13/6392 |
| | | | | | 439/367 |
| 6,601,698 | B2 | * | 8/2003 | Jakob | F16G 3/00 |
| | | | | | 198/844.2 |
| 2007/0231072 | A1 | * | 10/2007 | Jennings | F03B 13/10 |
| | | | | | 405/75 |
| 2014/0085029 | A1 | * | 3/2014 | Wilkinson | H01F 27/2455 |
| | | | | | 336/170 |
| 2018/0073305 | A1 | * | 3/2018 | Downing | E21B 17/20 |
| 2019/0093798 | A1 | * | 3/2019 | Loh | G01F 1/00 |
| 2019/0350059 | A1 | * | 11/2019 | Secretin | F21V 23/0442 |

FOREIGN PATENT DOCUMENTS

JP 11354183 A * 12/1999 ............ H02G 3/00

* cited by examiner

Primary Examiner — Paul D Kim
(74) *Attorney, Agent, or Firm* — Cantor Colburn LLP

(57) ABSTRACT

A flexible device including a plurality of subassemblies, a connector depending from each of the subassemblies, a link connected to the connectors supplying a signal connection between the subassemblies.

11 Claims, 6 Drawing Sheets

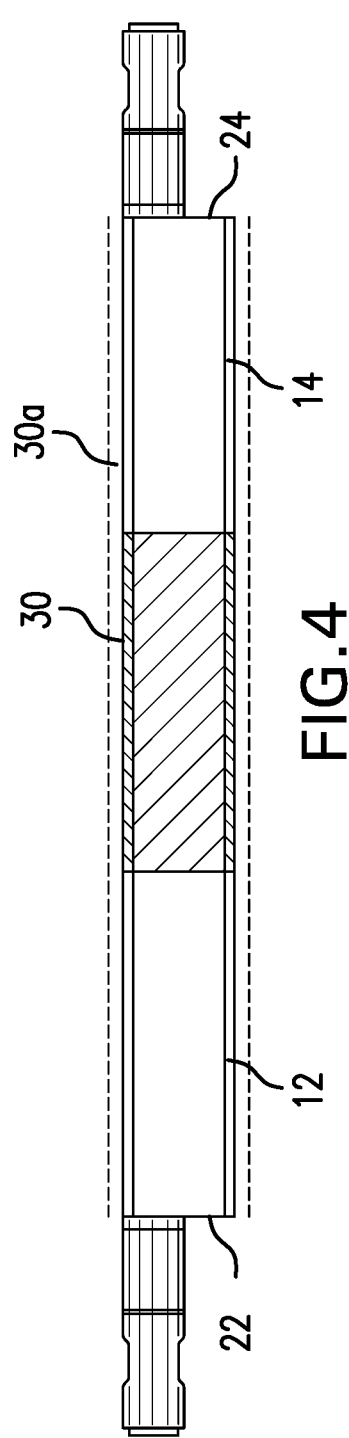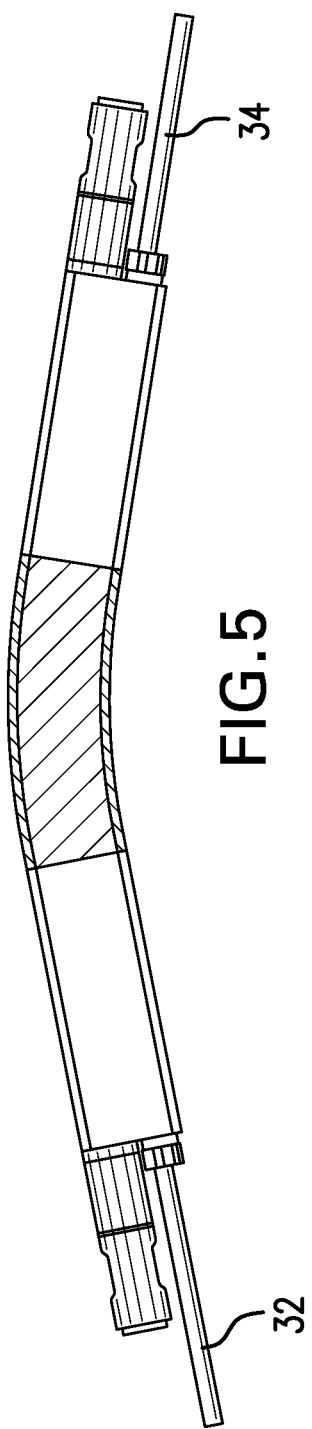

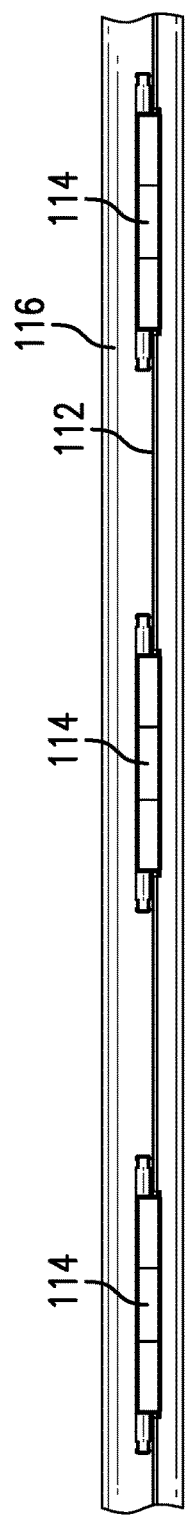
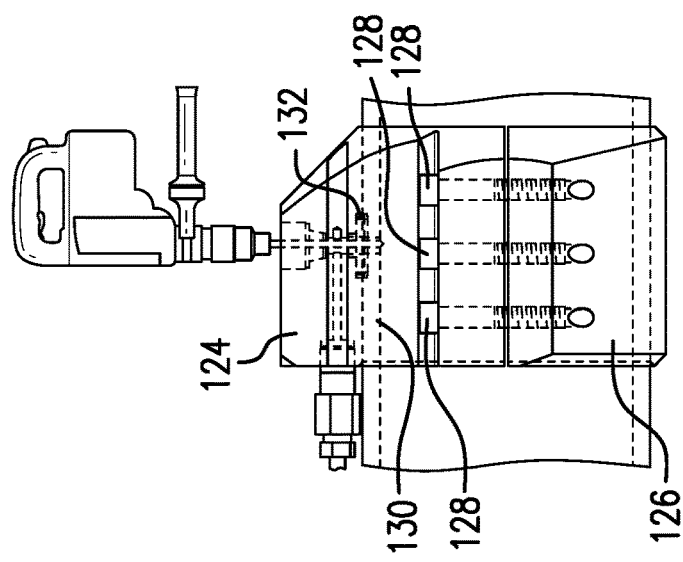
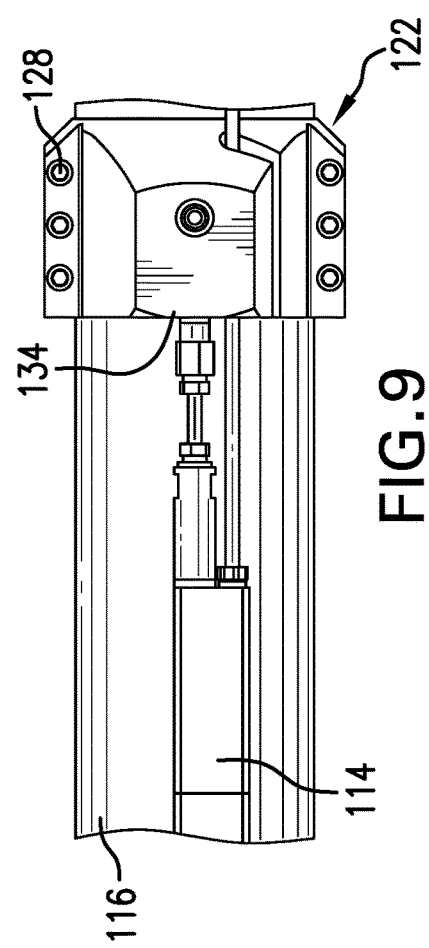

METHOD AND APPARATUS FOR DEPLOYMENT OF A DEVICE SYSTEM

BACKGROUND

Where long lengths of conduit are employed for various power, communications, monitoring, etc. duties are employed they are normally spooled to manage the conduit and pay it out in an organized manner. In some cases, other devices are disposed in line on the conduit to be spooled out therewith. These include plugs for example that are spaced to be useful to whatever the end utility of the conductor has been planned. In resource recovery industries, there may also be a sheave through which the spooled conduit must be run. This presents even more difficulty as sheaves are often of an even smaller radius than spools and hence require conduits to bend even more to move therethrough.

The concept of spooling devices could be expounded upon except for the radii of the spools, and sheaves in some instances, versus the intolerance to spooling of devices that might be otherwise of interest. The art would welcome advancements that allow other devices to be spooled.

Further, in the resource recovery industry it is often desirable to have sensory and communication systems deployed with downhole strings for various purposes. In general, such functionality is created by installing sensory devices at predetermined positions in subs, etc. and then connecting the devices with a conductor (hydraulic, optical, electric, etc.). Each of the devices is disposed in the string in accordance with a plan for the string set prior to running of the string and the connections for conductors are made as the string is run. Specifically, the conductor is terminated at each device as the string is run in the hole. The method is effective and supports routing and securement functions for the conductor but is time consuming. Terminations at each device have been avoided by spooling sensory or other devices on a conductor spool and then installing the devices in their designated subs but timing of the string and length between devices has been problematic with regard to conductor management leading to too much free conductor between devices to secure or the need to cut the conductor between devices and make terminations in any event, if the conductor is too short to reach the next sub or so long that there is no practical way to secure the excess.

The art would welcome alternative methods that improve efficiency and reduce cost.

SUMMARY

A flexible device including a plurality of subassemblies, a connector depending from each of the subassemblies, a link connected to the connectors supplying a signal connection between the subassemblies.

A resource recovery system including a spoolable conductor including a device disposed in line with the conductor, the device including a plurality of subassemblies, a connector depending from each of the subassemblies, a link connected to the connectors supplying a signal connection between the subassemblies.

A method for deployment of a device system including spooling out a conductor having a number of devices disposed thereon, and installing a device anchor/access point where the number of devices land on a portion of a string as dictated by a length of conductor between each device.

A device anchor/access point including a connection configuration having a device connection interface, a backing, securable to the connection configuration to produce an interference fit with a portion of a string upon which the device anchor/access point is disposed.

BRIEF DESCRIPTION OF THE DRAWINGS

The following descriptions should not be considered limiting in any way. With reference to the accompanying drawings, like elements are numbered alike:

FIG. 4 is a schematic view of the two subassemblies of FIG. 1 with an overmolding of flexible material protecting the connections illustrated in FIGS. 2 and 3;

FIG. 5 illustrates the bending capability of FIG. 4;

FIG. 8 is a view of three devices laid out on the portion of the string;

FIG. 9 is an enlarged view of one of the devices shown in FIG. 1 and with a device anchor/access point disposed at one device on the portion of a string;

FIG. 10 is a schematic illustration of accessing the string ID through the device anchor/access point.

DETAILED DESCRIPTION

A detailed description of one or more embodiments of the disclosed apparatus and method are presented herein by way of exemplification and not limitation with reference to the Figures.

Figure 1:
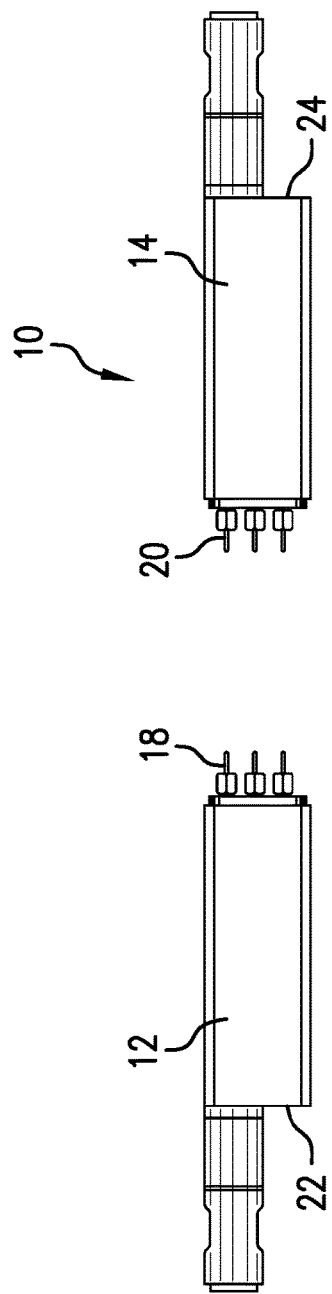
FIG. 1 is a schematic view of a device built as two subassemblies.

Referring to FIG. 1, a multipart device 10 is illustrated. Though two subassemblies 12 and 14 are shown in FIG. 1, more are also contemplated. Multipart device 10 has functions that longer devices, for example gauges, of the prior art have but due to its subassembly makeup, it avoids the rigidity and hence the problems longer gauges bear. More specifically, a longer gauge when spooled or run through a radius that causes the gauge to take a longer path than prescribed by the radius will bear bending moments through the gauge itself and could become inoperable. Further, connections to the gauge experience severe angles with the gauge. Due to the unique construction of embodiments of the invention, the devices 10 are able to bend thereby removing the risk of bending moment induced inoperability of the device and reducing connection angles to conductors at each end of the device 10. Creating subassemblies 12 and 14 requires determining which components can be packaged in each subassembly and then operationally connected to the other subassembly through links 16 (see FIG. 2) at connectors 18 and 20. The connectors 16 allow for both operability of the device 10 and for the flexibility offered by this construction. Links 16 may be electrical conductors, optic fibers, hydraulic lines, combinations including at least one of the foregoing or others. Each subassembly further provides a conductor termination 18 and 20. It will be appreciated that if a particular device 10 is configured with more than two subassemblies, then the additional subassemblies that are placed between subassemblies 12 and 14 will not have conductor terminations 22 or 24 but rather will have connectors 18 and 20 on both ends of the subassembly. Upon connection of links 16, subassemblies 12 and 14 operate as a single unit for whatever function is desired. They operate identically to prior art devices such as gauges that are long and rigid but the devices 10 are flexible.

In some embodiments (see FIG. 3), it is desirable to add strength members 26 such as chains, steel rope, aramid fiber, etc. between the subassemblies 12 and 14 to ensure the device 10 is configured to resist a tensile load, explosive decompression forces encountered during pull operations, and abrasive environments encountered during installation operations, for example. The strength member 26 may replace links 16 when signal is not required or may also act as a signal carrier is desired.

Figure 2:
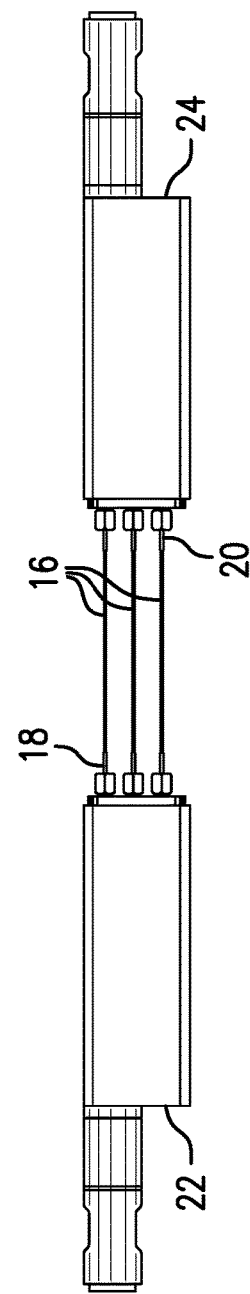
FIG. 2 illustrates the subassemblies of FIG. 1 connected to one another using a flexible signal capable media.
Figure 3:
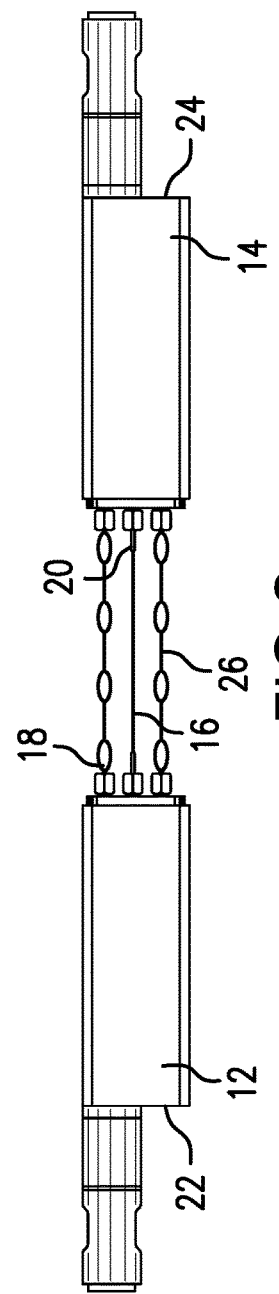
FIG. 3 illustrates a reinforced flexible connection between the subassemblies.

While it may be sufficient to employ the device 10 as illustrated in FIGS. 1-3, it is also contemplated to provide for exterior protection of the links 16 and, if applicable, strength members 26 in the form of a boot 30. This is schematically illustrated in FIGS. 4 and 5. One method for providing this protection is an overmolding operation that disposes a molded rubber boot 30 over at least adjacent ends of the subassemblies 12 and 14 or over the whole (30*a*) of the subassemblies but for the conductor terminations 22 and 24. Materials contemplated for the boot 30 include but are not limited to rubbers such as NBR, HNBR, AFLAS, etc. The boot 30 may suffice on its own or in other embodiments, strength members 26 may also be contained in the boot 30. Whether or not strength members such as wires and steel chains are used, the device 10 with subassemblies 12 and 14 is placed inside a tubular mold that may comprise a top half and bottom half. In an embodiment, at least one third of each subassembly 12 and 14 will be contained inside the mold. The mold is heated to 150C-250C whereafter an un-cured rubber compound is placed inside the mold along with the subassemblies as noted. The mold is closed by placing a top half of the mold onto the top of the bottom half of the mold or other equivalent operation where portions of a mold are brought together to form a complete mold. In an iteration, the mold will be held at temperature for about 20 to about 40 minutes and allowed to cool. A completed device 10 with boot 30 will then be available.

Figure 6:
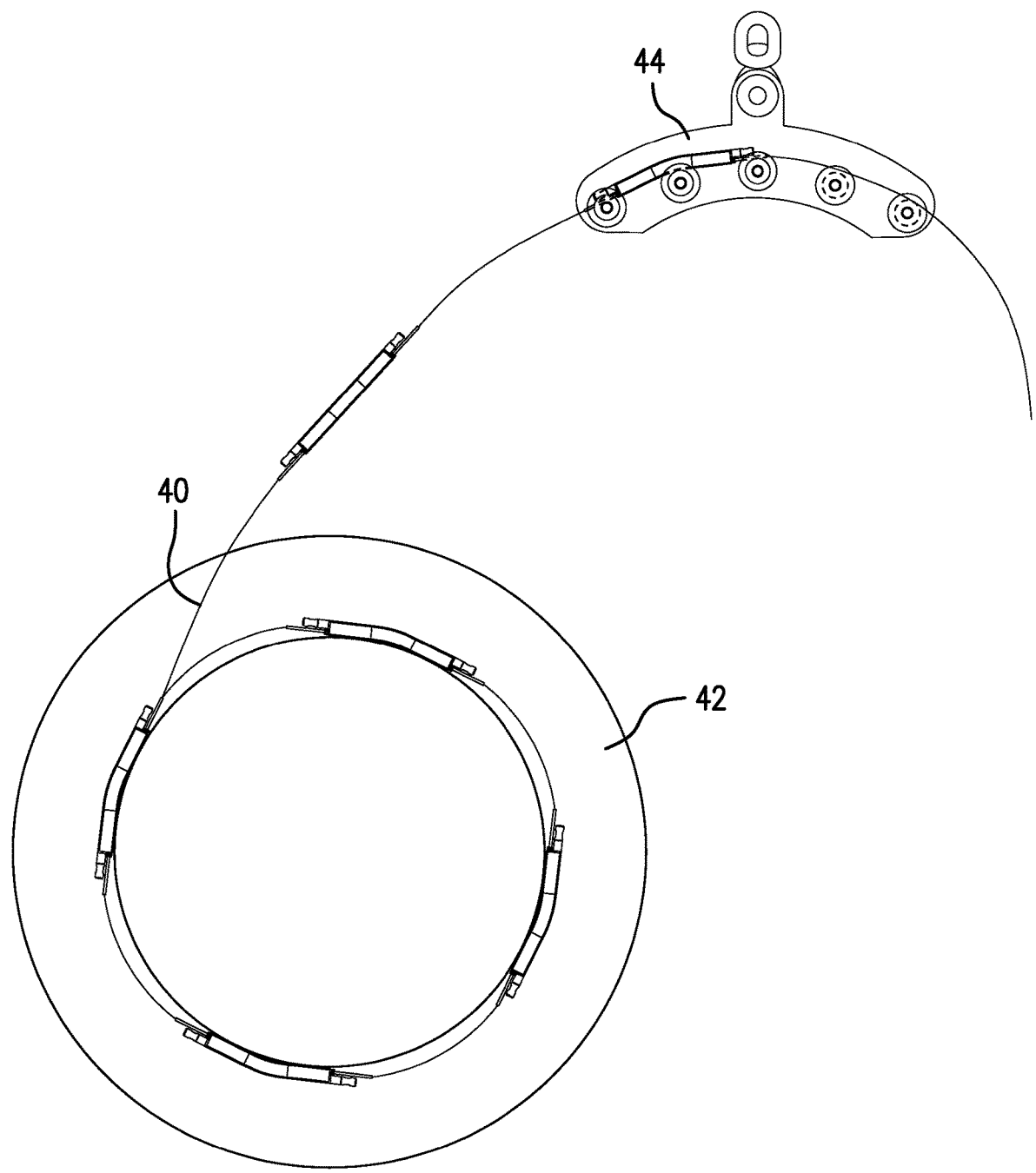
FIG. 6 is a view illustrating a conductor with a number of the subassembly devices disposed inline therein and spooled and additionally shows a sheave through which the deploying conductor will pass in some operations.

FIG. 5 illustrates the flexibility of the booted device 10. FIG. 5 also illustrates the conductor terminations 22 and 24 terminated to conductor segments 32 and 34 that together over the number of devices 10 that are used form an elongated spoolable conductor 40. The conductor 40 is illustrated on a spool 42 in FIG. 6. Further, the conductor is illustrated running through a sheave 44 in FIG. 6. Review of the condition of the device 10 on the spool relative to the device 10 located between the spool 42 and the sheave 44 and then the device 10 located in the sheave 44 reveals the flexibility of the device 10 and its effect on the conductor segments and conductor terminations in the various conditions. Because the devices 10 flex, the conductor terminations 22 and 24 as well as conductor segments 32 and 34 are always in a relatively straighter path than they would be if the devices 10 did not flex.

Figure 7:
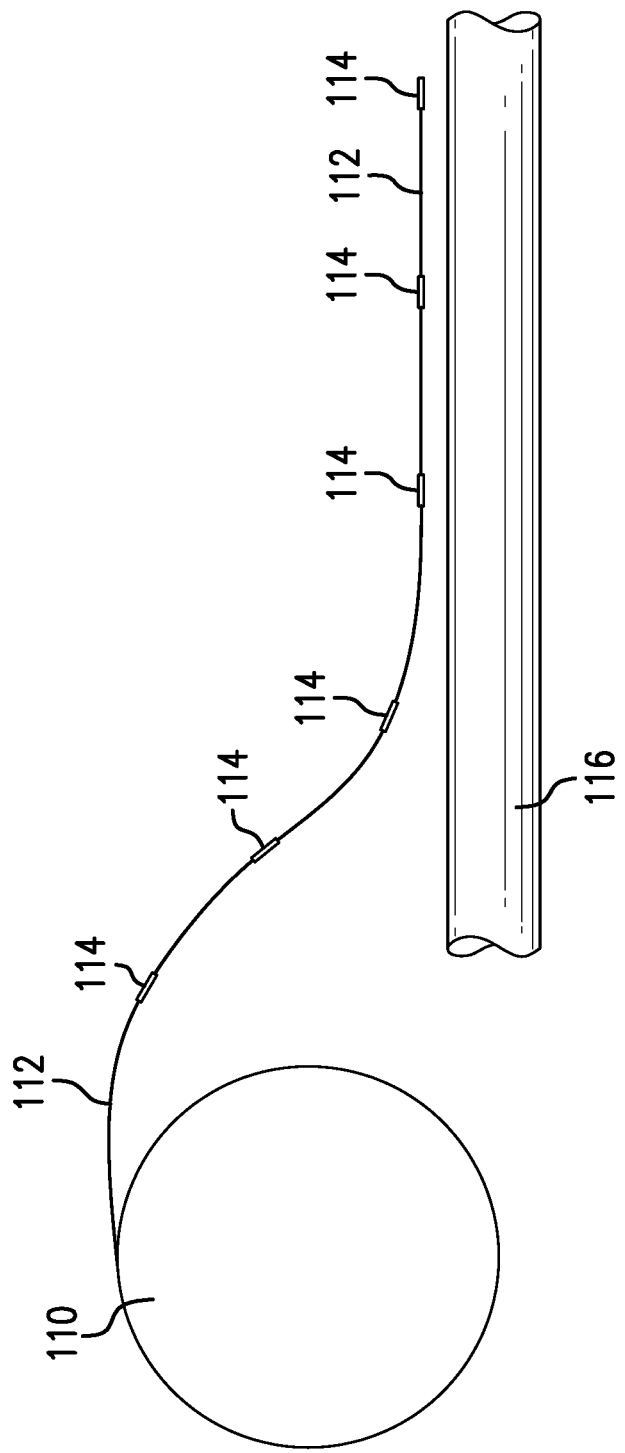
FIG. 7 is a schematic view of devices on a spool being laid out on a portion of a string.

Referring to FIG. 7, the overall concept for deployment of a sensor system is broadly illustrated employing a spoolable conductor with devices therein as disclosed above. The method and apparatus as disclosed herein significantly reduce the time and cost of deployment of a sensor system.

Still referring to FIG. 7, a spool 110 like those discussed above, includes conductor 112 (hydraulic, electric, optic, etc.) with sensor devices 114 pre-connected to the conductor 112. Further, the conductor 112 is illustrated being laid adjacent a portion 116 of downhole string such as a completion string.

Referring to FIG. 8, devices 114 are visible laid out on the portion 116 with essentially straight conductor 112 therebetween. In other words, the conductor length between the devices 114 dictates the placement of the devices 114 rather than a prepositioned connector on the string. Facilitating a device 114 layout based upon the length of conductor 112 between devices 114 ensures that the conductor 112 between devices 114 is easily managed (no slack and no splicing) and increases speed of deployment as well as increasing working efficiency which both reduce costs. In the illustration of FIG. 8, marking of a landing site 120 of each device 114 is made. The mark is used to position a device anchor/access point 122 such that the device 114 will easily and correctly engage therewith without pulling on or creating slack in the conductor 112. This will occur at the natural landing site 120 for each device 114 that is employed.

Referring to FIGS. 9 and 10, the method continues with attaching the device 114 to the device anchor/access point 122 and attaching the device anchor/access point 122 to the portion 116 of the string (not otherwise shown). It is to be understood that embodiments may occur in either order depending upon ease of connection and efficiency. Specifically, the device 114 may be connected to the point 122 and then the point 122 attached to the portion 116 or the point 122 may be attached to the portion 116 and then the device 114 connected to the point 122. In either case, the matter is simple in that the conductor 112 dictates placement and no conductor splices are needed or management of excess conductor is required. Once the point 122 is secured to the portion 116 an access port 132 to the portion 116 interior 130 can be opened via drilling, milling, acid, vaporization, explosive charge, etc. providing that whatever method is selected results in an opening from the outside of the portion 116 to the inside thereof in a way that is sealable by the point 122 and the device 114 such that the device 114 has access to fluid within the portion 116.

Figure 11:
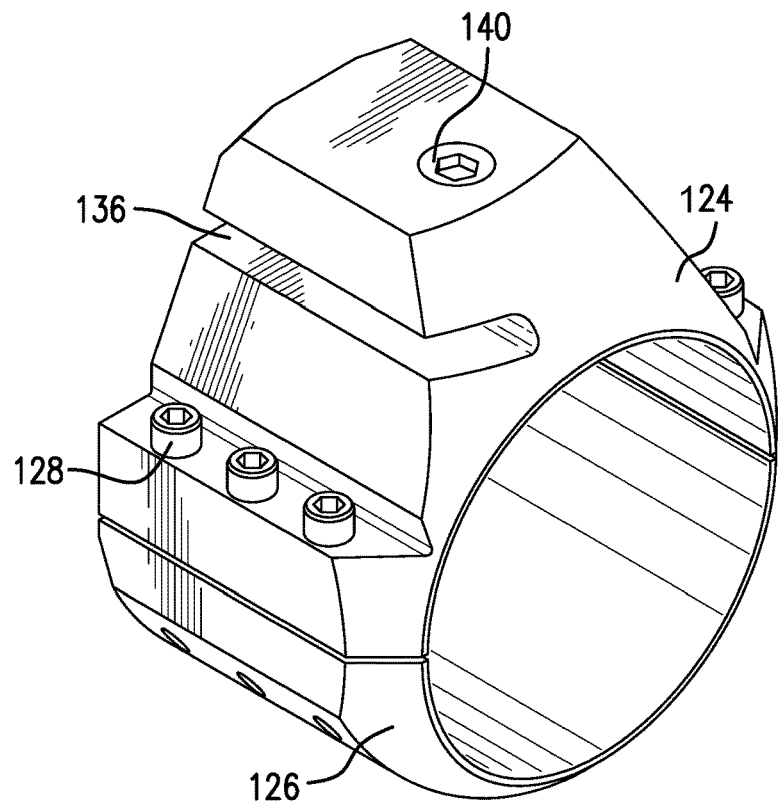
FIGS. 11 and 12 are perspective views of a device anchor/access point as disclosed herein.
Figure 12:
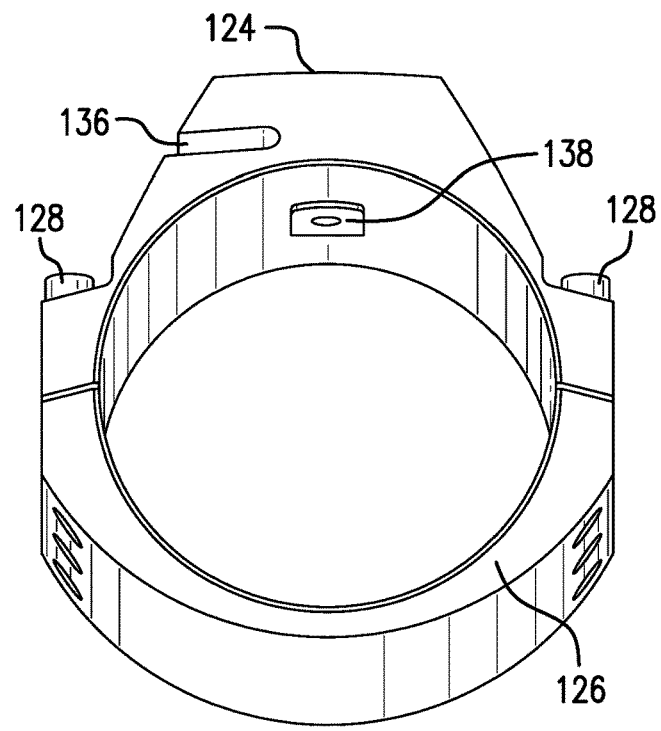

In an embodiment, referring to FIGS. 11 and 12, the device anchor/access point 122 is configured as a shaft collar having two parts labeled herein as connection configuration 124 and backing 126 that is drawn around the portion 116 (not shown in FIGS. 5 and 6, refer to other drawings) by threaded fasteners 128. In each of FIGS. 11 and 12, the fasteners 128 are illustrated in the assembled condition. Six are shown though more or fewer may be employed for various iterations.

The connection configuration will include a device connection interface 134 to connect with a device 114 in a way that facilitates sensory activity or control activity upon fluid flowing in the interior 130 of portion 116 through port 132. Further the connection configuration 124 may optionally include a conductor holder 136 to secure conductor 112 passing through to another point 122.

In an embodiment, the connection configuration is provided with a seal 138 that seals against portion 116 when the point 122 is installed thereon to prevent leakage of fluid between the point 122 and the portion 116 once the port 132 is opened. Finally, in some embodiments, a plug 140 is provided to close an access passageway for the drill or other opening modality.

Set Forth below are some Embodiments of the Foregoing Disclosure:

Embodiment 1: A flexible device including a plurality of subassemblies, a connector depending from each of the subassemblies, a link connected to the connectors supplying a signal connection between the subassemblies.

Embodiment 2: The device as in any prior embodiment further comprising a strength member extending between the subassemblies.

Embodiment 3: The device as in any prior embodiment further comprising a boot extending between the subassemblies.

Embodiment 4: The as in any prior embodiment wherein the boot is overmolded rubber.

Embodiment 5: The device as in any prior embodiment wherein the boot is overmolded rubber reinforced with a strength member.

Embodiment 6: The device as in any prior embodiment wherein the boot extends to cover the subassemblies except for conductor terminations of the subassemblies.

Embodiment 7: A resource recovery system including a spoolable conductor including a device disposed in line with the conductor, the device including a plurality of subassemblies, a connector depending from each of the subassemblies, a link connected to the connectors supplying a signal connection between the subassemblies.

Embodiment 8: A method for instrumenting a target environment including disposing one or more devices as in any prior embodiment to create a conductor, running the conductor into a target environment.

Embodiment 9: The method as in any prior embodiment wherein the running includes running through intermediate equipment.

Embodiment 10: A method for deployment of a device system including spooling out a conductor having a number of devices disposed thereon, and installing a device anchor/access point where the number of devices land on a portion of a string as dictated by a length of conductor between each device.

Embodiment 11: The method as in any prior embodiment, further including marking a location of the number of devices on the portion of the string.

Embodiment 12: The method as in any prior embodiment, further including connecting the device to the device anchor/access point.

Embodiment 13: The method as in any prior embodiment, further including opening a port in the portion of the string through the device anchor/access point to an interior of the portion of the string.

Embodiment 14: The method as in any prior embodiment, wherein the opening is by drilling or milling.

Embodiment 15: The method as in any prior embodiment, wherein the opening is chemical action.

Embodiment 16: The method as in any prior embodiment, where the number of devices is a plurality of devices and spooling includes marking a landing site for each of the plurality of devices on the portion of the string, the marking serving as a target for the installing of the device anchor/access point.

Embodiment 17: The method as in any prior embodiment, further including securing a conductor in a conductor holder of the device anchor/access point.

Embodiment 18: A device anchor/access point including a connection configuration having a device connection interface, a backing, securable to the connection configuration to produce an interference fit with a portion of a string upon which the device anchor/access point is disposed.

Embodiment 19: The device anchor/access point as in any prior embodiment, wherein the backing is secured to the connection configuration with threaded fasteners.

Embodiment 20: The device anchor/access point as in any prior embodiment, further including a conductor holder.

Embodiment 21: The device anchor/access point as in any prior embodiment, further including a seal.

Embodiment 22: The device anchor/access point as in any prior embodiment, further including a plug.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A resource recovery system comprising:
   a spoolable conductor including;
   a device disposed in line with the conductor, the device including a plurality of subassemblies;
   a connector depending from each of the subassemblies;
   a link connected to the connectors supplying a signal connection between the subassemblies;
   a connection configuration having a device connection interface configured to connect with the device to facilitate sensory activity or control activity of the device with a fluid flowing in an interior of a tubular member of the resource recovery system; and
   a backing, securable to the connection configuration to produce an interference fit with the tubular member of the resource recovery system.

2. A method for instrumenting a target environment comprising:
    running the resource recovery system as claimed in claim 1 into a target environment.

3. The method as claimed in claim 2 wherein the running includes running through intermediate equipment.

4. A method for deployment of the resource recovery system as claimed in claim 1, comprising:
    spooling out the conductor having a number of the devices disposed thereon; and
    installing a device anchor/access point where the number of devices land on a portion of a string as dictated by a length of conductor between each device.

5. The method as claimed in claim 4, further including marking a location of the number of devices on the portion of the string.

6. The method as claimed in claim 4, further including connecting the device to the device anchor/access point.

7. The method as claimed in claim 4 further including opening a port in the portion of the string through the device anchor/access point to an interior of the portion of the string.

8. The method as claimed in claim 7 wherein the opening is by drilling or milling.

9. The method as claimed in claim 7 wherein the opening is chemical action.

10. The method as claimed in claim 4 where the number of devices is a plurality of devices and spooling includes marking a landing site for each of the plurality of devices on the portion of the string, the marking serving as a target for the installing of the device anchor/access point.

11. The method as claimed in claim 4, further including securing the conductor in a conductor holder of the device anchor/access point.

* * * * *